Patented Apr. 23, 1929.

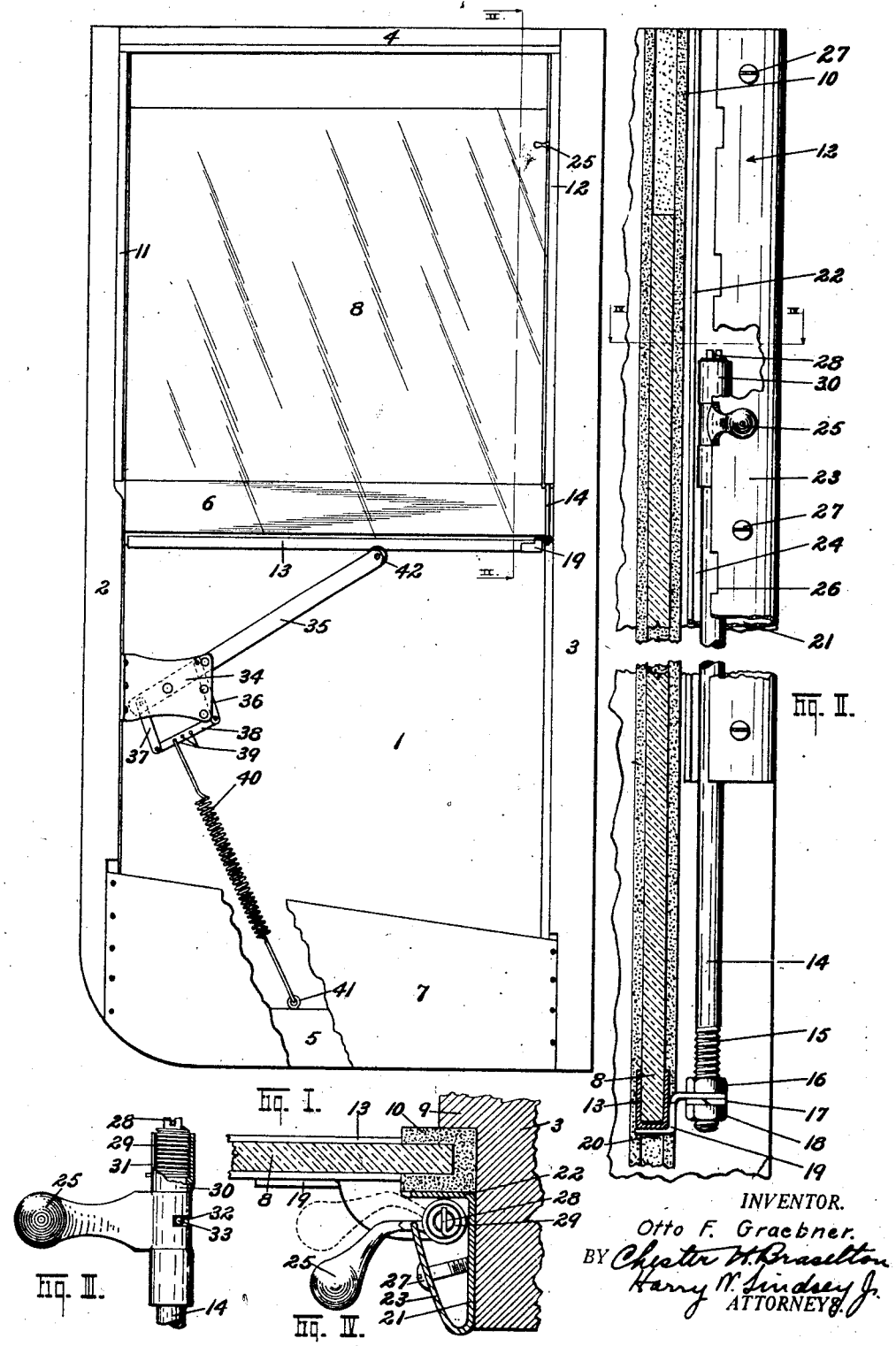

1,710,090

UNITED STATES PATENT OFFICE.

OTTO F. GRAEBNER, OF TOLEDO, OHIO, ASSIGNOR TO THE WILLYS-OVERLAND COMPANY, OF TOLEDO, OHIO, A CORPORATION OF OHIO.

WINDOW REGULATOR.

Application filed February 21, 1921. Serial No. 446,893.

My invention relates to improvements in window regulators and is more particularly directed to a means for regulating windows in the doors of the bodies of automobiles.

One object of my invention is to provide a device of this character by which a window in the body of an automobile may be readily raised or lowered.

Another object of this invention is to provide a device by which the position of a window in an automobile body may be regulated with little effort.

A further object of the invention is to provide a device of the character described wherein an operating means is secured to the window of an automobile body and by which means the operator of the car may progressively elevate or lower the window readily without being compelled to grasp the window itself as is customary.

A further object of the invention is to provide a device of the character described having a simple, efficient and positively acting means co-operating with a mechanism comprising such a well balanced structure that but little effort is required for the operator to regulate the window of an automobile body.

Another object of the invention is to provide a device of the character described in which a rod provided with an operating lever and attached to a portion of the window in an automobile body will guide the window into a number of positions when the said rod is operated.

Another object of the invention is to provide a simple supporting frame for the window glass in an automobile body having means by which the window can be supported and fastened in a predetermined position.

Other objects of this invention relate to economies of manufacture and details of construction which will hereinafter appear in the detailed description to follow.

The objects of the invention are accomplished in one instance by the devices and means described in the following specification, but it is evident that the same may vary widely without departing from the scope of the invention, as pointed out in the appended claims.

A structure constituting one embodiment of the invention, which may be the preferred, is illustrated in the accompanying drawing, forming a part hereof in which:

Figure I is a front elevation of the door of an automobile showing the parts in operative position for lowering or elevating the window.

Figure II is a transverse sectional view of the device along the line II—II of Figure I.

Figure III is a view in detail of the finger piece connected with the upper end of the operating rod.

Figure IV is a transverse sectional view of Figure II along the line IV—IV of Figure II.

The device comprises three units, the door frame which carries the window and its operating parts, secondly, the window glass and its frame including the operating parts connected wth the window, and third, the counterbalance which overcomes the weight of the glass so that the same may be more readily raised or lowered.

The door frame 1 comprises side members 2 and 3, joined by the upper and lower cross pieces 4 and 5 respectively, and braced by an intermediate member 6, the lower end of the door being further braced by a foot board 7. Vertical guides for the window 8 are formed in the side pieces 2 and 3. Each guide comprises an outer stop portion 9 which is made integral with the side frame members 2 and 3 of the door frame, a felt lining 10 in which the glass 8 slides, and an inner stop member. The inner stop members 11 and 12 are identical in configuration, but while the member 11 is preferably made of solid material, the member 12, having a double function which will be presently described, is made of sheet metal and bent to conform to the shape of the inner stop member 11.

On the bottom of the window is secured a channel frame 13 to which is secured an operating rod 14. The rod is threaded at 15 upon which a nut 16 is screwed. A split ring 17 and a lock nut 18 securely fastens the free end of a connecting member 19 in position on the rod 14. The connecting member 19 is provided with two angular bent portions and connected at its other end by a screw 20 to the channel frame 13 which is attached to the glass 8.

The member 12 not only forms part of the guide way for the glass 8, but acts as a guide and keeper for the operating rod 14 of the glass, and as such comprises a base member 21, a stop member 22 which is at right angles to the base member and forming the inner part of the guideway for the glass, and a curved top member 23, the free end of which lies adjacent the free end of the stop member 22, and forming therewith a slot 24 for a spring pressed finger piece 25 of the rod 14. The free end of the top member is provided with a series of notches 26 to receive the finger piece 25 to position the window in any desired position.

The member 12 is secured to the side frame members by any suitable means such as screws 27 passing through the top and base members 21 and 23 respectively.

The end of the operating rod 14 is bifurcated at 28 to receive one end of a spring 29 mounted in the sleeve 30, the other end being secured in a slot 31 in the sleeve 30. The sleeve 30 has a semi-annular slot 32 in which a pin 33 formed on the rod 14 is adapted to have a limited movement to prevent the spring form unwinding and also to check the oscillatory movement of the finger piece.

The counterbalance is mounted on a bracket 34 which is attached to the side member 2 of the door and comprises a lever 35 pivoted intermediate its ends on the bracket and projecting downwardly on each side of the pivot point of the lever are two links 36 and 37 joined by a third link 38. This third link 38 has a series of perforations 39 in one of which the free end of a spring 40 is engaged. The other end of the spring 40 is fastened to the lower cross piece 5 by means of an eye bolt 41. A pulley 42 on the free end of the lever 35 engages the channel frame.

The operation of the device is as follows:

The finger piece 25 being located in one of the notches 26 of the guide member 12, is removed by the operator and the rod 14 may be lowered or raised. If the rod 14 is lowered, the window 8 being connected with the rod, is carried downwardly together with the free end of the lever 35 by reason of its engagement with the channel frame 13 of the window through the medium of the pulley 42 on the end of the lever 35. Thus the depending link 38 is shifted to the left, carrying with it the upper end of the spring 40 which is slightly elevated. It will be seen that the upper end of the spring is shifted through different positions without increasing or diminishing the pull on the spring in the different positions of the window. The finger piece being removed from one of the notches will allow the window to be raised or lowered step by step by the operator. When the finger piece 25 is released by the operator, the spring 29 will automatically force the finger piece as it comes opposite one of the notches 26 towards the guide 12 and into latched position with the notch and the stop pin 33 on the rod 14 will limit the movement of the finger piece towards the guide 12.

While I have shown and described in considerable detail an embodiment of my invention, it is to be understood that this showing and description is illustrative only, and for the purpose of rendering my invention more clear, but that I do not regard the same as limited to the details of construction illustrated or described, or any of them, except insofar as I have included such limitations within the terms of the following claims, in which it is my intention to claim all novelties inherent in my invention, broadly, as well as specifically.

Having thus described my invention, what I claim as new and desire to secure by Letters Patent, is:—

1. A window regulator comprising in combination a glass, a guiding means therefor, a supporting rod connected to the lower end of the glass, a guide for said rod provided with notches and forming part of the guideway for said glass, and a sleeve revolubly mounted on the end of the rod and provided with an operating arm, said arm being adapted to cooperate with the notches to secure the rod in a predetermined position.

2. A window regulator comprising in combination a glass, a guiding means therefor, a supporting rod connected to the lower end of the glass, an integral guide member for said rod provided with notches and forming part of the guiding means for said glass, a spring pressed oscillatory latching means engaging the notches in the guide and adapted to be moved horizontally and vertically for unlatching the rod and adjusting the position of the window respectively.

3. A window regulator comprising in combination a glass, a guiding means therefor, a supporting rod connected to the lower end of the glass and provided with a finger piece, an integral guide strip for said rod, said strip comprising a base portion, a side portion forming part of the guiding means for the glass, and a top portion provided with notches, the finger piece being adapted to engage the notches to position the glass.

4. A window regulator for automobiles comprising in combination a glass, a guiding means therefor, an operating rod connected at one end to the lower end of the window, a guide strip for said rod, the said guide strip comprising a base portion, a side portion forming part of the guiding means for the glass, and a curved top portion bent at an acute angle to the base member.

5. A regulator for windows in automobile bodies comprising in combination a glass, a guiding means therefor, an operating rod for the glass, said guiding means for the glass comprising front and removable rear stops, one of said rear stops forming a hollow guideway for the operating rod of the glass.

6. A regulator for windows in automobile bodies, comprising in combination a glass, a guiding means therefor, an operating rod for the glass, said guiding means for the glass comprising front stops and removable rear stops, one of said rear stops forming a hollow guideway, and a securing means for the operating rod of the glass.

7. A regulator for windows in automobile bodies, comprising in combination a door frame, a window glass, a guideway in the door frame for slidably mounting the glass, an operating rod for the glass, said guideway comprising front stops for the glass integrally formed with the door frame, and rear stops removably mounted on the frame, one of said rear stops forming a guideway for the operating rod.

8. A regulator for the glass of an automobile window comprising an operating rod therefor, a sheet metal strip having a portion secured to the window casing, a portion at substantially right angles thereto for guiding said glass and a portion forming with said other portions a guideway for said operating rod, the edge of said last portion having notches and said rod having a member for engaging said notches.

9. In a window control mechanism, the combination with a window frame and a glass therein, a hollow molding secured upon the frame, a rod connected with the glass adjacent the bottom thereof and extending vertically upward within said molding, and a latch member upon the rod and radially movable with respect thereto adapted to engage in any one of a series of notches formed in one edge of the molding whereby to hold the glass in the desired position.

10. The combination with a window frame having a shoulder portion and a glass slidably disposed adjacent the shoulder, of a hollow molding member secured to the frame having a portion cooperatively disposed with respect to the glass and shoulder portion and provided with an indentured portion, a rod vertically movable within the molding and secured to the glass, and a handle for manually raising and lowering the rod engageable with the indentured portion of the molding to maintain the desired position of adjustment.

11. The combination with a window frame having a shoulder portion and a glass slidably disposed adjacent thereto, of a supporting rod connected to the lower end of the glass and provided with a pivotable finger piece, an integral guide housing said rod comprising a base portion secured to the frame, a lateral portion cooperatively disposed with respect to the shoulder portion of the frame for guiding the glass, and a face portion having a series of indentures adapted to be engaged by the finger piece for maintaining the position of adjustment of the rod.

In testimony whereof I affix my signature.

OTTO F. GRAEBNER.